May 30, 1933.  B. F. BERRY  1,911,742
STRIPPER FOR CUTTING MACHINES
Filed May 4, 1931  2 Sheets-Sheet 1
Fig. 1.
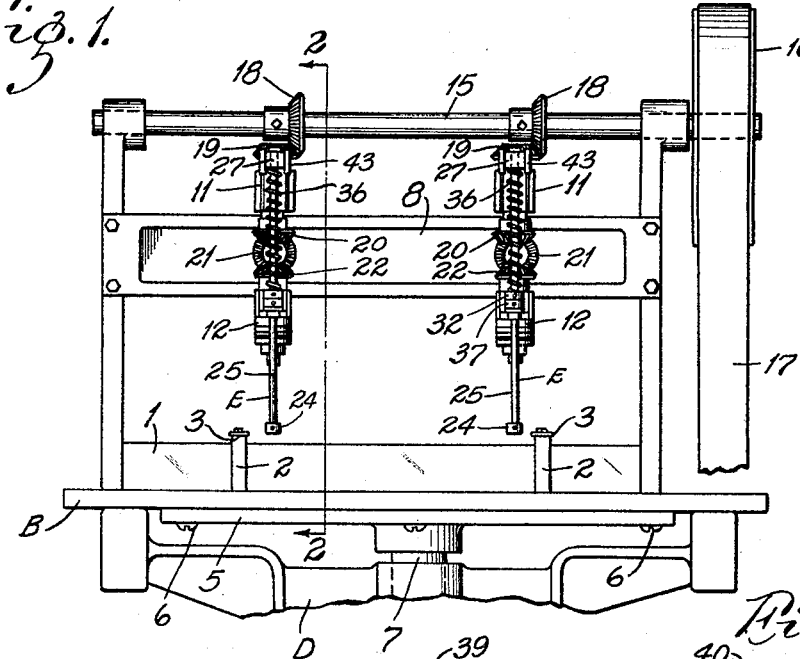
Fig. 2.
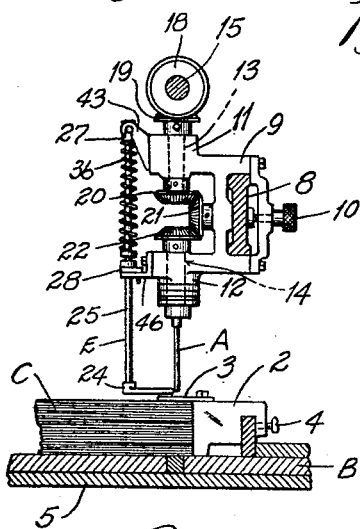
Fig. 3.
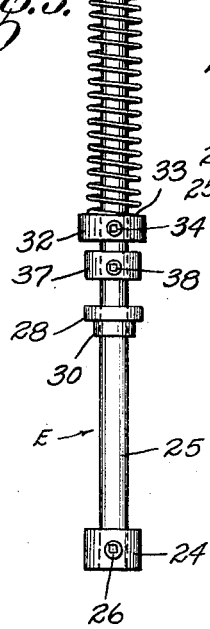
Fig. 4.
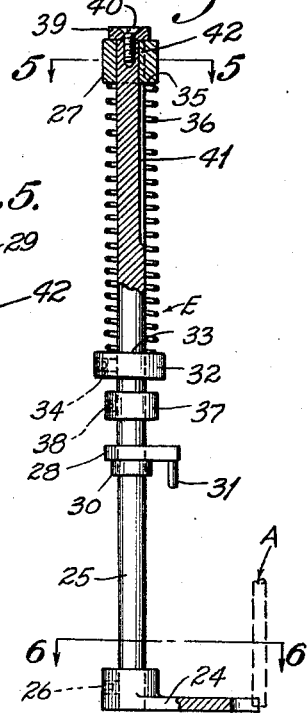
Fig. 5.
Fig. 6.
INVENTOR.
B. F. BERRY.
By Albert J. McCauley
ATTORNEY.

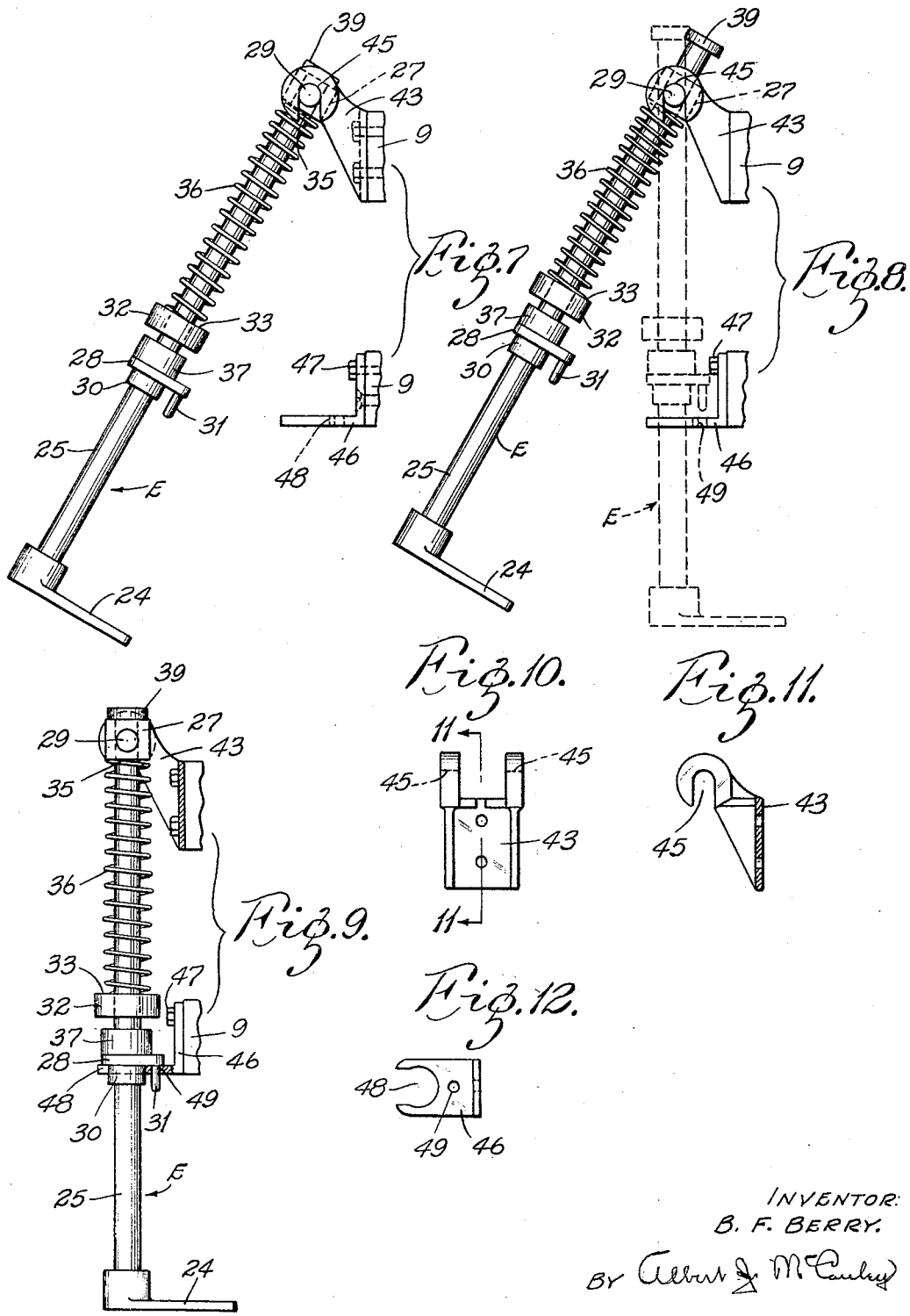

Patented May 30, 1933

1,911,742

UNITED STATES PATENT OFFICE

BENJAMIN F. BERRY, OF ST. LOUIS, MISSOURI, ASSIGNOR TO BERRY MACHINE COMPANY, OF ST. LOUIS, MISSOURI, A CORPORATION OF MISSOURI

STRIPPER FOR CUTTING MACHINES

Application filed May 4, 1931. Serial No. 534,853.

This invention relates to strippers for cutting machines, and is especially suitable for use in cutting machines having round hole cutters or drills to form holes in the work.

An object of this invention is to provide a stripper which is movable in one direction to separate the work from the cutter after the cutting operation and movable in another direction to an inoperative position remote from the cutter.

Another object of this invention is to provide a stripper detachably interlocked with the cutting machine, so that the stripper can be very easily and quickly removed from the machine.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. 1 is a front view of a cutting machine provided with round hole cutters and strippers to separate the work from the cutters, the base of the machine being broken away.

Fig. 2 is a vertical section taken on the line 2—2 in Fig. 1 and includes the work located below the stripper and cutter.

Fig. 3 is a front view on a larger scale showing the stripper removed from the machine.

Fig. 4 is a side view of the stripper, partly in section, the cutter being shown in dotted lines.

Fig. 5 is a section taken on the line 5—5 in Fig. 4, showing the upper guide and the stripper splined thereto.

Fig. 6 is a section taken on the lines 6—6 in Fig. 4.

Fig. 7 is a side view showing the upper portion of the stripping device pivotally interlocked with the machine, and the lower interlocking elements separated from each other.

Fig. 8 is a similar view showing the stripper moved upwardly as a preliminary step in uniting the lower interlocking elements.

Fig. 9 is a similar view showing the stripper in its operative position, with the several interlocking elements united to secure the stripping device to the machine.

Fig. 10 is a front view of the upper support for the stripper.

Fig. 11 is a section taken on the line 11—11 in Fig. 10.

Fig. 12 is a top view of the lower support for the stripper.

To illustrate one form of my invention I have shown a cutting machine in Figs. 1 and 2, said machine being a round hole cutter adapted to perforate a pile of paper sheets.

However, since my improved stripper may be applied to other cutting machines wherein it is desirable to separate the work from the cutter after the cutting operation, this invention is not limited to the herein described cutting machine.

The cutting machine may be provided with round hole cutters A, and a table B to receive the work C which may be sheets of paper, as shown in Fig. 2. The table B has a horizontal alining member 1 which is provided with gages 2 having arms 3 adapted to project over the work. The gages 2 may be adjustably secured to the alining member 1 by the set screws 4 as shown in Fig. 2.

A support 5 may be secured to the bottom of the table by the screws 6. The support 5 is secured to the guide rod 7 located in the base D. The guide rod 7 may be moved vertically in the base D by any suitable means (not shown) so that the table B is movable toward the cutters A during the cutting operation and away from the cutters after the cutting operation.

Figs. 1 and 2 show how the cutters may be supported by a stationary horizontal bar 8. Each cutter is provided with a supporting frame 9 slidably mounted on the horizontal bar 8, and adapted to be secured by a set screw 10, as shown in Fig. 2. Each frame 9 is provided with bearings 11 and 12 to receive vertical shafts 13 and 14, shown in Fig. 2, the rotary cutter A being secured to the lower shaft 14.

The means for rotating the cutters comprises a shaft 15 (Fig. 1) having a pulley 16 driven by a belt 17, and gear wheels 18 secured to said shaft, each of said gear wheels being associated with one of the cutters.

As shown by Fig. 2, each gear wheel 18 meshes with a gear 19 at the upper end of a shaft 13, and the rotary motion is transmitted from a gear 20 at the bottom of said shaft to an intermediate gear 21, and thence to a gear 22 at the upper end of the vertical shaft 14, the cutter A being secured to the lower end of said shaft.

In Fig. 1, I have shown a stripper E located in front of each of the cutters A to separate the work from the cutters when the table is moved away from the cutters after the cutting operation.

Each stripper E preferably comprises a presser foot 24 which may straddle the cutter A as shown in Fig. 6, and a rod 25 secured to the presser foot by a set screw 26, as shown in Figs. 3 and 6.

The rod 25 may be located in an upper guide 27 and a lower guide 28, and is adapted to move vertically in both of the guides. The upper guide 27 is provided with pivot members 29 (Fig. 5) and the lower guide has a contracted portion 30 and a locking key 31, as shown in Fig. 4.

A collar 32 having a spring seat 33 is secured to the rod 25 by a set screw 34. The upper guide 27 has spring seat 35 and a spring 36 is located on the rod between the upper and lower guides 27 and 28. The spring 36 engages the spring seat 35 on the upper guide and the spring seat 33 on the collar 32 and tends to force the upper guide 27 and the collar 32 away from each other. The collar 32 is adjustable on the shaft, by unscrewing the set screw 34 to vary the pressure of the spring.

A stop in the form of a collar 37 is secured by a set screw 38 to a portion of the rod above the lower guide 28 to limit the motion of the rod 25 through the lower guide. The collar 37 is also adjustable on the rod 25 so this rod, which has the presser foot 24 attached thereto, is adjustable to different positions or elevations.

The upper end of the rod is provided with a lateral extension which may be in the form of the head 39 to limit the downward motion of the rod through the upper guide. The head 39 may be secured to the rod by a screw 40, as shown in Fig. 4.

The rod 25 may have a vertical key-way 41 and the inner face of the upper guide 27 may have a key 42 extending into the said key-way 41 to prevent rotation of the rod, as shown in Figs. 4 and 5.

An upper support preferably in the form of a bracket or socket 43 (Fig. 11) may be secured to a portion of the machine, as shown in Fig. 9. This upper bracket 43 may be provided with slots 45 open at the bottom to receive the pivot members 29 on the upper guide 27.

A lower support which may be in the form of a bracket or socket 46 may be secured by a screw 47 to a portion of the machine such as the frame 9. The lower socket 46 may have a relatively large recess 48 (Figs. 9 and 12) to receive the contracted portion 30 of the lower guide, and a relatively small hole 49 to receive the locking key 31 on the lower guide.

When it is desired to secure the stripper to the machine, the pivot members 29 on the upper guide may be located in the slots 45 in the upper socket while holding the stripper in the position shown in Fig. 7. The rod 25 and lower guide 28 may then be moved to the position shown by the full lines in Fig. 8 and the stripper turned on the pivot members 29 to the position shown by dotted lines in Fig. 8, where the rod and lower guide are lowered to the interlocked position shown in Fig. 9.

When the stripper is located in the position shown in Fig. 9, the spring 36, since it engages the spring seat 35 on the upper guide and the spring seat 33 on the collar 32 which is secured to the rod, will yieldingly force the pivot members into the slots 45 of the upper socket and at the same time impart a downward pressure to the rod with the presser foot attached. In other words, the spring will hold the upper guide in an interlocked position, and force the rod and presser foot downwardly after the cutting operation, so as to separate the work from the cutter.

The lower guide 28 will be held in position by the contracted portion 30 and the locking key 31, as shown in Fig. 9.

When it is desired to remove the stripper to an inoperative position remote from the cutter, the rod 25 and lower guide 28 are moved upwardly from the locked position shown in Fig. 9 to the position shown by dotted lines in Fig. 8. The stripper is then movable on the pivot 29 to a position remote from the cutter, such as shown in Fig. 7, and if it is desired the stripper can be entirely removed from the machine when it occupies the position remote from the cutter by merely removing the pivots 29 from the open slots 45 in the upper socket.

The presser foot 24 lies above the work C, as shown in Fig. 2 wherein the spring 36 acting on the collar 32 has forced the rod 25 downwardly until the stop collar 37 engages the interlocking guide 28. As the table B rises to lift the work during the cutting operation, the work imparts an upward motion to the presser foot 24 and rod 25, and the collars 32 and 37 then move upwardly with the rod 25. During the return stroke, the spring 36 acting on the collar 32 forces the work downwardly until the presser foot reaches the position shown in Fig. 2. When in this position, the bottom of the presser foot is slightly lower than the bottom of the cutter A, so it will strip the work from the cutter.

To provide for the use of cutters of different lengths, the presser foot can be adjusted vertically by adjusting the rod 25 in the stop collar 37.

The desired pressure of the spring 36 is obtained by adjusting the collar 32, independently of the stop collar 37.

It will also be understood that under all of these conditions, the spring 36 imparts an upward thrust to the guide 27, thereby retaining the pivots 29 in interlocking engagement with the bracket.

However, the operator can very easily unlock the device by merely imparting an additional upward movement to the rod 25, then removing the locking collar 28 from the lower bracket 46. The socket in this lower bracket is open at the front, as shown in Fig. 12, so the unlocked rod 25 is free to swing out of said open socket, and the entire stripping device can then be removed by merely permitting the pivots 29 to move out of the open slots 45.

When the stripper is removed, it appears as shown in Figs. 3 and 4, and the head 39 at the upper end of rod 25, then limits the displacement of the spring-pressed guide 27.

I claim:

1. In a cutting machine provided with a cutter, a stripper to separate the work from the cutter, and guides in which said stripper is slidably mounted, said guides having interlocking members whereby said stripper is detachably interlocked with the machine.

2. In a cutting machine provided with a cutter, a detachable stripper to separate the work from the cutter, said stripper comprising a presser foot adapted to rest upon the work, a rod secured to the presser foot, supports secured to the machine, and guides in which said rod is slidably mounted, said guides being detachably interlocked with said supports to detachably secure said rod and presser foot.

3. In a cutting machine provided with a cutter, a detachable stripper to separate the work from the cutter, said stripper comprising a presser foot adapted to rest upon the work, a rod secured to the presser foot, a guide provided with pivot members, another guide provided with an interlocking element, said rod being located in said guides and adapted to move therein, and sockets secured to portions of the machine, one of said sockets being provided with slots to receive said pivot members, the other of said sockets having an opening to receive said interlocking element.

4. In a cutting machine provided with a cutter, a detachable stripper to separate the work from the cutter, said stripper comprising a presser foot adapted to rest upon the work, a rod secured to the presser foot, interlocking members whereby said rod and presser foot are detachably interlocked with the machine, and means to yieldingly force one of said interlocking members to its locked position.

5. In a cutting machine provided with a cutter, a stripper to separate the work from the cutter, said stripper being provided with a presser foot and a spring seat, an interlocking element whereby said stripper is detachably interlocked with the machine, said interlocking element being provided with a spring seat, and a spring engaging said seat to yieldingly force said interlocking element and presser foot to their operative position.

6. In a cutting machine provided with a cutter, a detachable stripper to separate the work from the cutter, said stripper comprising a presser foot adapted to rest upon the work, a rod secured to the presser foot, interlocking elements whereby said rod and presser foot are detachably interlocked with the machine, sockets secured to the machine and adapted to receive said interlocking elements, and means to yieldingly force one of said elements and said presser foot to their operative positions.

7. In a cutting machine provided with a cutter, a detachable stripper to separate the work from the cutter, said stripper comprising a presser foot adapted to rest upon the work, a rod secured to the presser foot, a guide having a spring seat and pivot members, another guide having an interlocking element, sockets secured to said machine, one of said sockets being adapted to receive said pivot members, the other of said sockets being adapted to receive said interlocking element, said rod being located in said guides and provided with a spring seat, and a spring engaging said spring seats to yieldingly force said pivot member and said presser foot to their operative positions.

8. In a paper cutting machine provided with a round hole cutter and a table to support the work, a detachable stripper to separate the work from the cutter, said stripper comprising a presser foot adapted to rest upon the work, a rod secured to the presser foot, an upper guide provided with pivot members, a lower guide, said rod being located in said guides and adapted to move therein, a collar secured to a portion of said rod to limit the motion of the rod, said collar being adjustable so that the rod and the presser foot are adjustable to different elevations, an upper socket secured to a portion of the machine, said socket being provided with slots to receive the pivot members on said upper guide, a lower socket secured to a portion of the machine and having an opening to receive said lower guide, and means to yieldingly force said rod to a lowered position and the pivot members into said slot, said means comprising a spring seat on said rod and a spring located between said spring seat and said upper guide member, said spring seat being adjustable to vary the tension of said spring.

9. In a paper cutting machine provided with a round hole cutter and a table adapted to move toward and away from said cutter, a detachable stripper to separate the work from the cutter when the table is moved away from the cutter, said stripper comprising a presser foot straddling said cutter and adapted to rest upon the work, a rod secured to the presser foot, an upper guide provided with pivot members, a lower guide having a locking key, said rod being located in said guides and adapted to move vertically therein, a collar secured to a portion of said rod above said lower guide member, said collar being adjustable so that the rod and the presser foot are adjustable to different elevations, the upper end of said rod being provided with a laterally extended head to limit the downward motion of the rod through said upper guide, an upper socket secured to a portion of the machine, said upper socket being provided with downwardly extended slots open at the bottom to receive the pivot members of said upper guide, a lower socket secured to a portion of the machine, said lower socket being provided with a recess to receive a portion of said lower guide and a hole to receive said locking key, the pivot members of said upper guide being located in the slots in said upper socket, the lower guide member having a contracted portion located in the recess in said lower socket, and means to yieldingly force said rod to a lowered position and said pivot members into said slot, said means comprising another collar secured to said rod and a spring located between said last mentioned collar and said upper guide member, said last mentioned collar being adjustable to vary the tension of said spring.

10. A cutting machine provided with a cutter, a stripper to separate the work from the cutter, said stripper having a spring seat, a spring engaging said seat to force the stripper onto the work, said spring seat being adjustable to vary the pressure of the spring, and a stop member to limit the movement of said stripper, said stop member being adjustable longitudinally of said stripper, independently of said spring seat, so as to provide the desired adjustment of the stripper irrespective of the pressure of said spring.

11. In a cutting machine provided with a cutter, a stripper to separate the work from the cutter, said stripper comprising a presser foot adapted to rest upon the work, a rod secured to the presser foot, upper and lower guides secured to the machine, said rod being located in said guides and adapted to move therein, a collar secured to a portion of said rod to limit the motion of the rod, said upper guide having a spring seat, said rod being provided with a spring seat, and a spring engaging said seats to yieldingly force said presser foot onto the work, the spring seat on said rod being adjustable to vary the pressure of said spring.

12. In a cutting machine provided with a cutter, a stripping device comprising a presser foot adapted to rest upon the work, a rod secured to the presser foot, upper and lower guides in which said rod is slidably mounted, and a pivot on said upper guide whereby the upper guide is secured to the machine independently of the lower guide, said lower guide being detachable from the machine to release the stripping device and permit pivotal motion of said rod about the axis of said pivot.

In testimony that I claim the foregoing I hereunto affix my signature.

BENJAMIN F. BERRY.